UNITED STATES PATENT OFFICE.

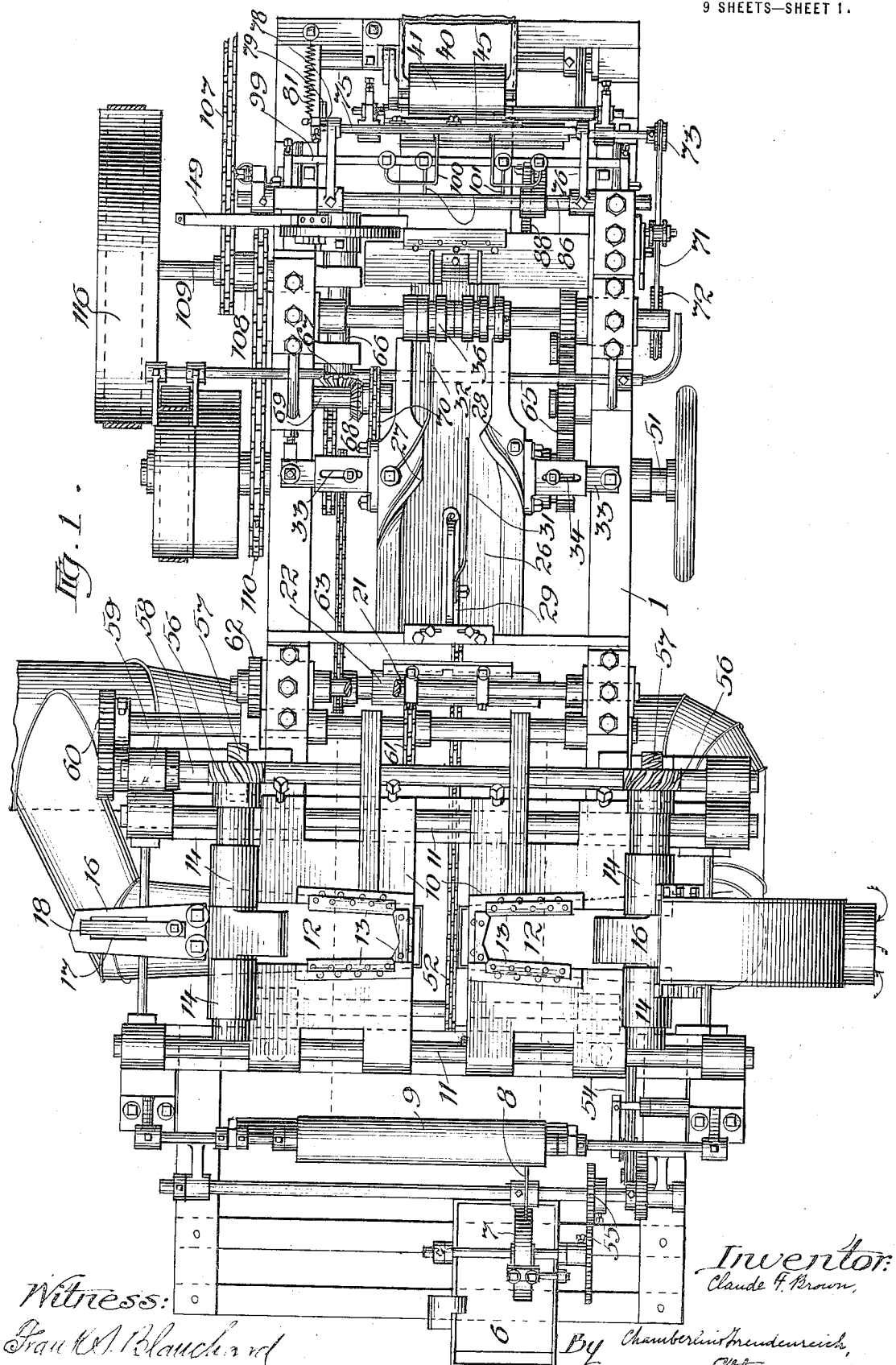

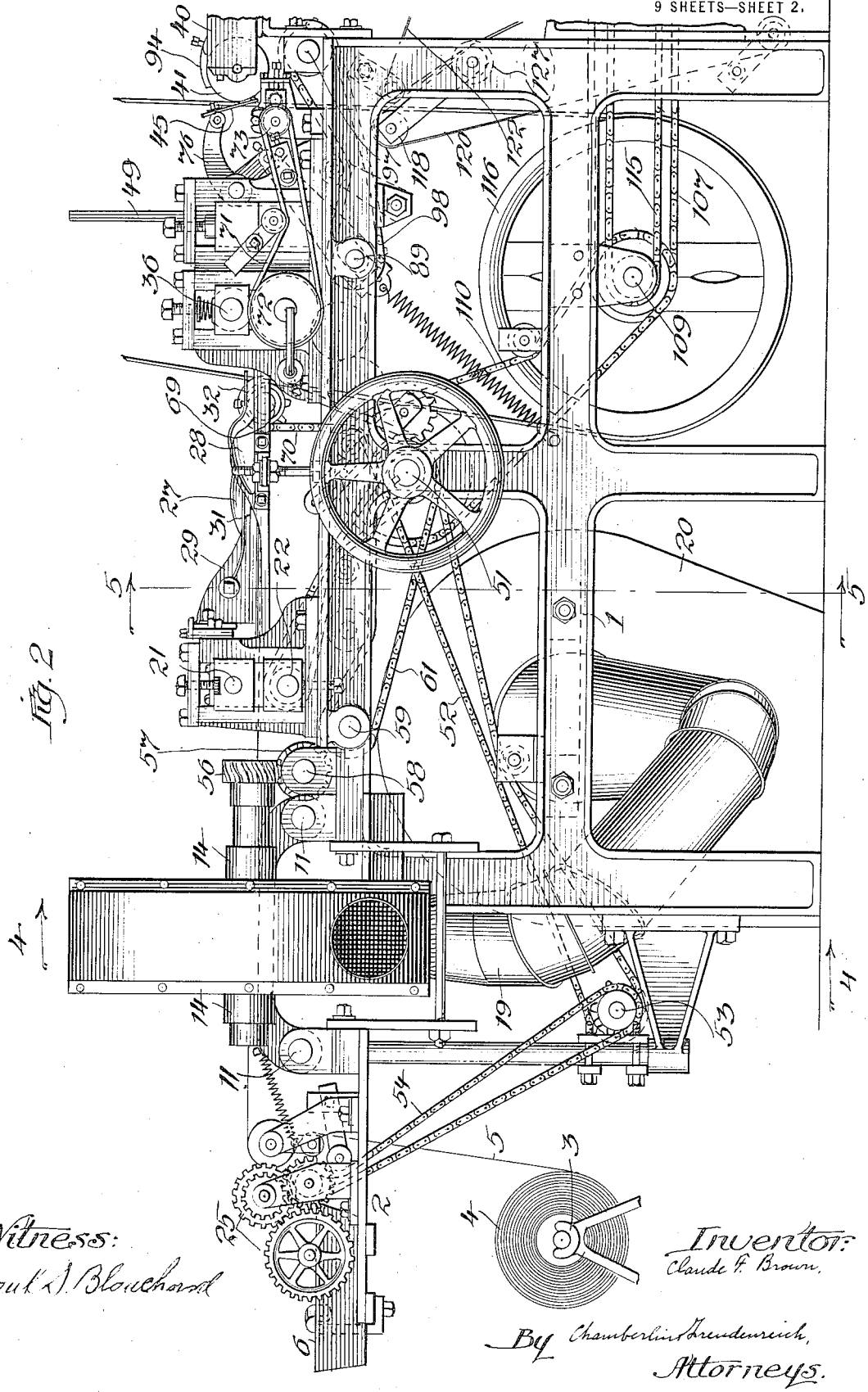

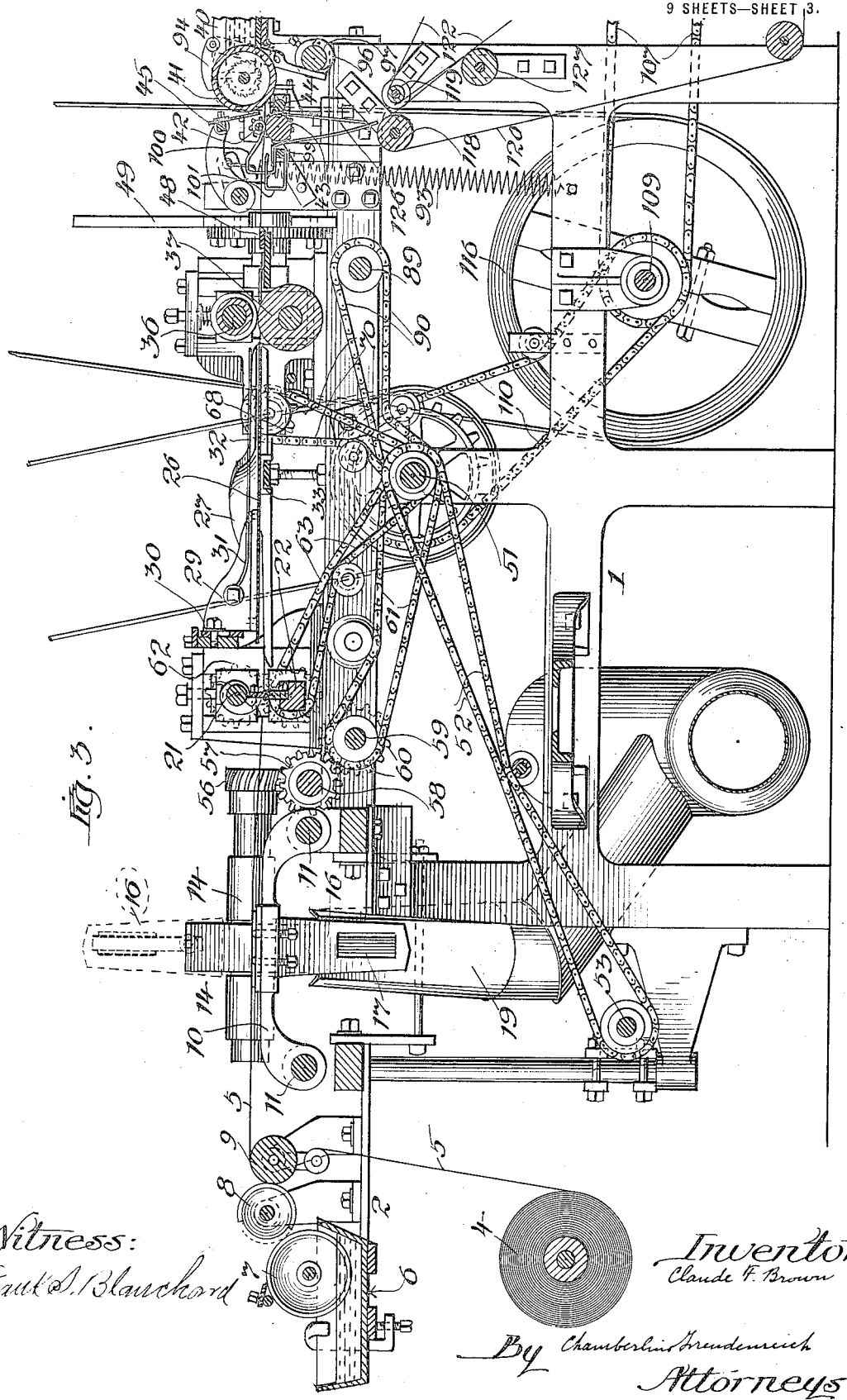

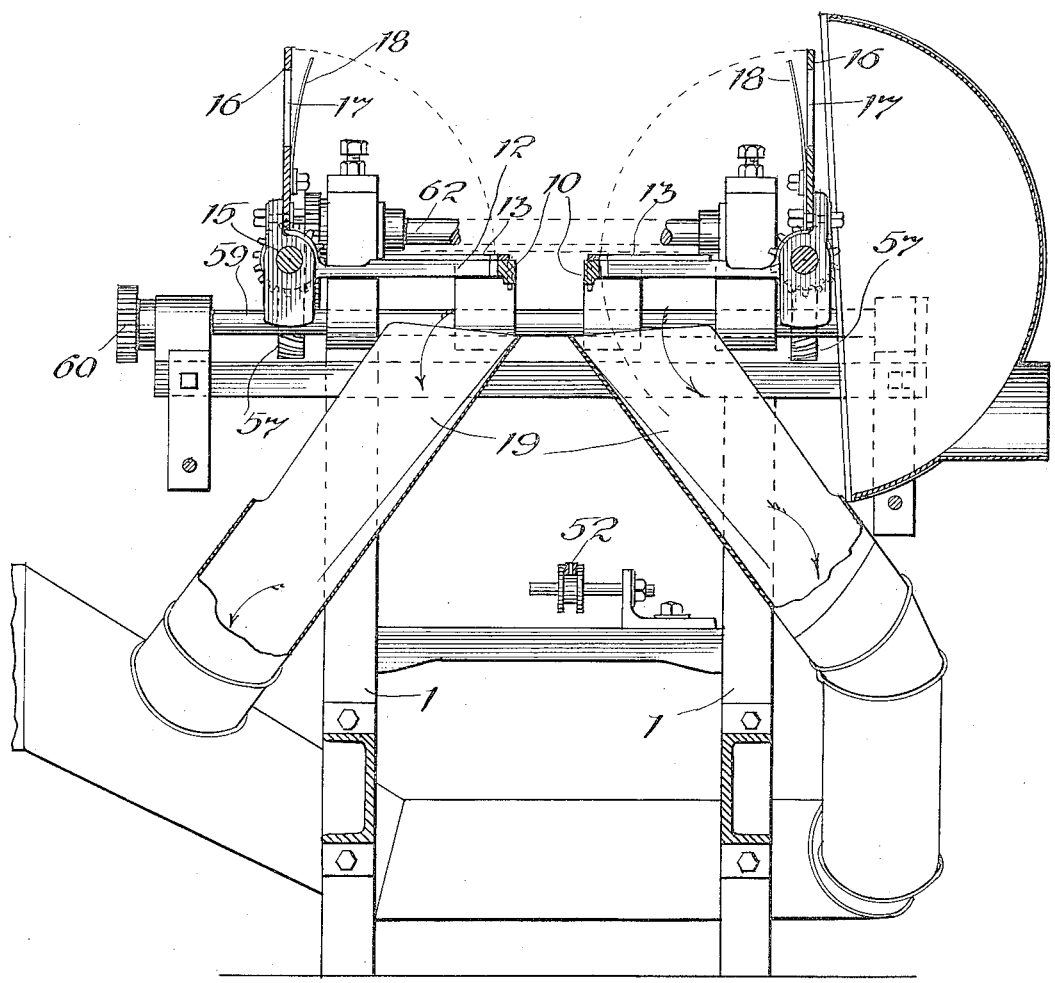

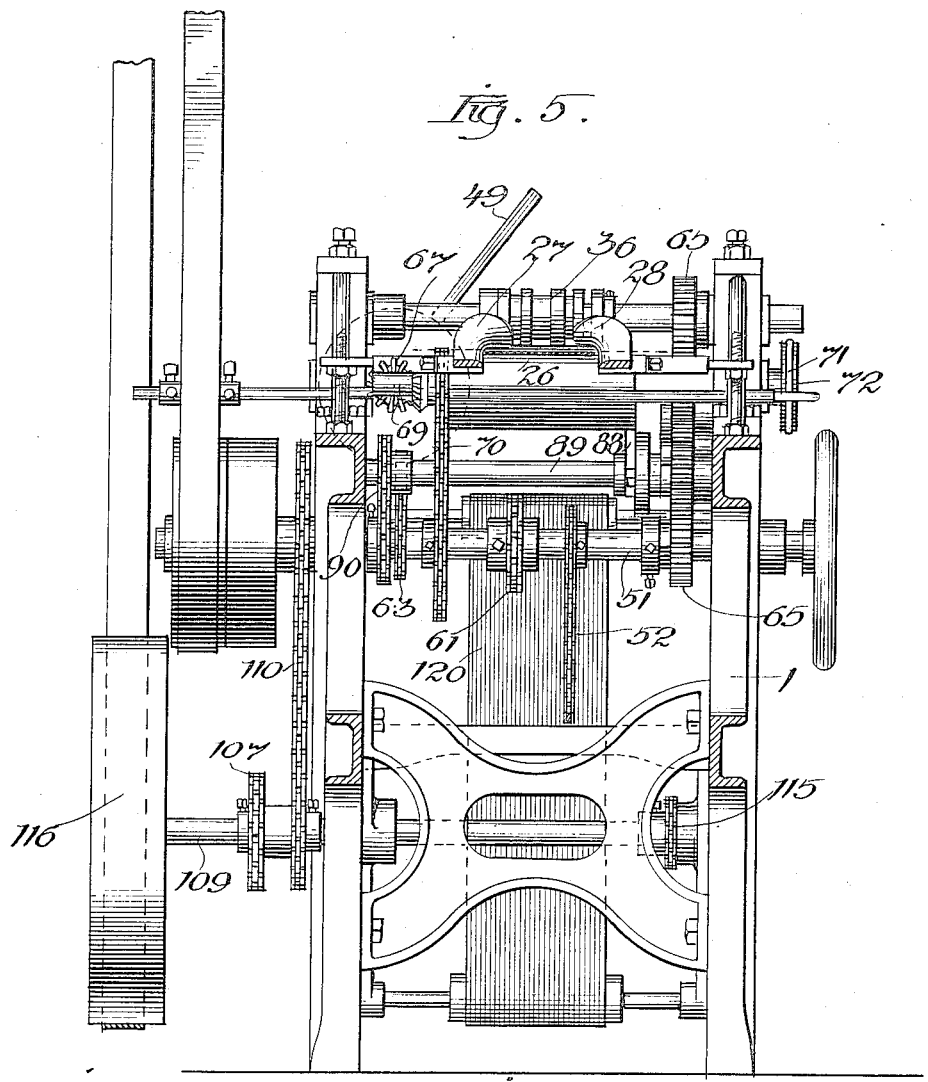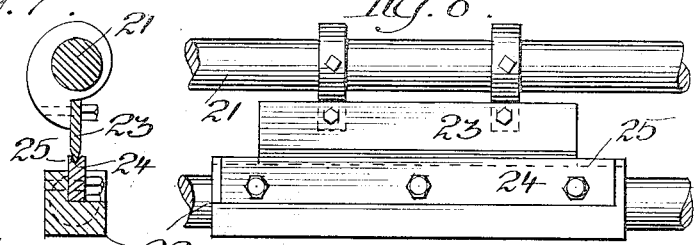

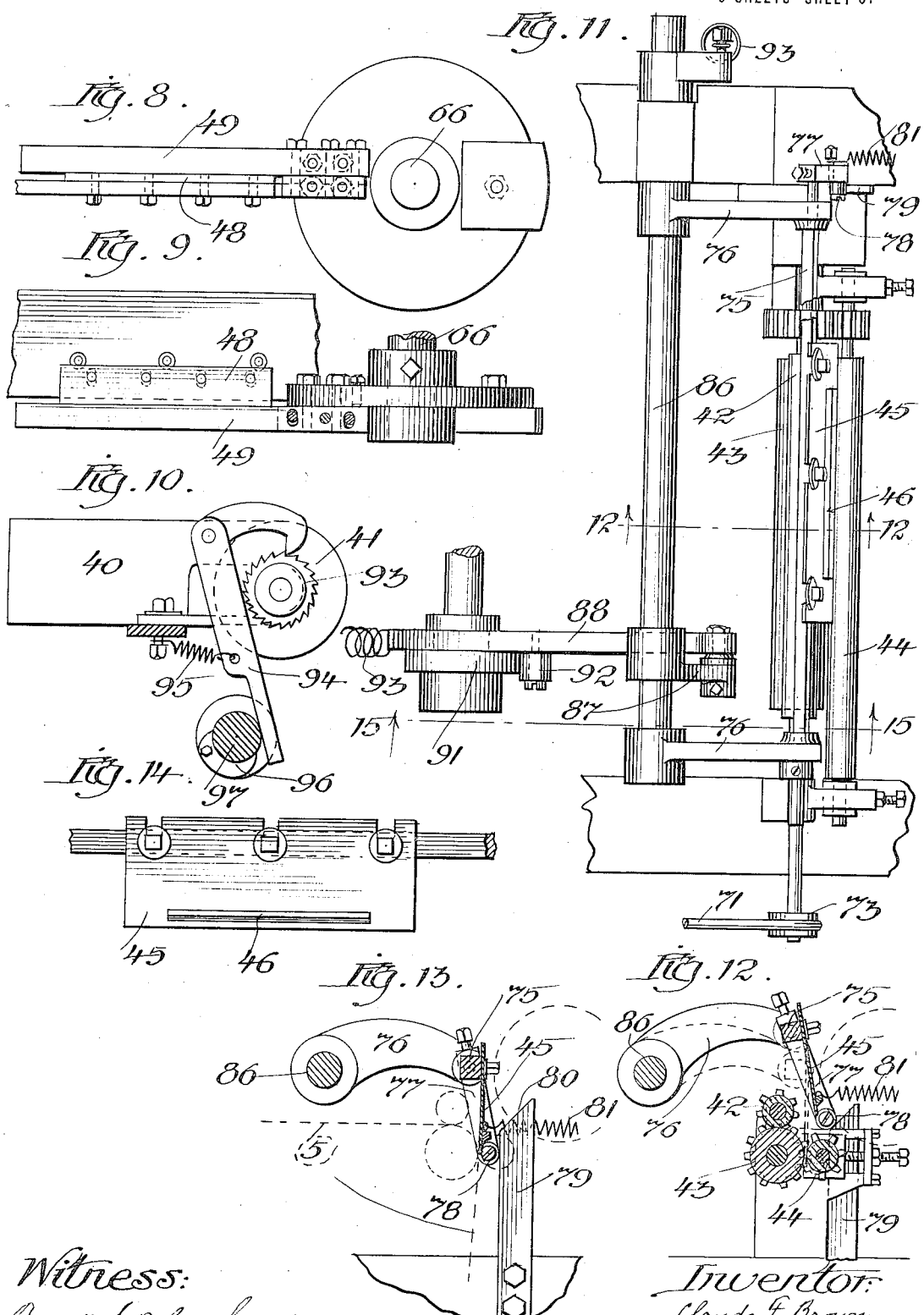

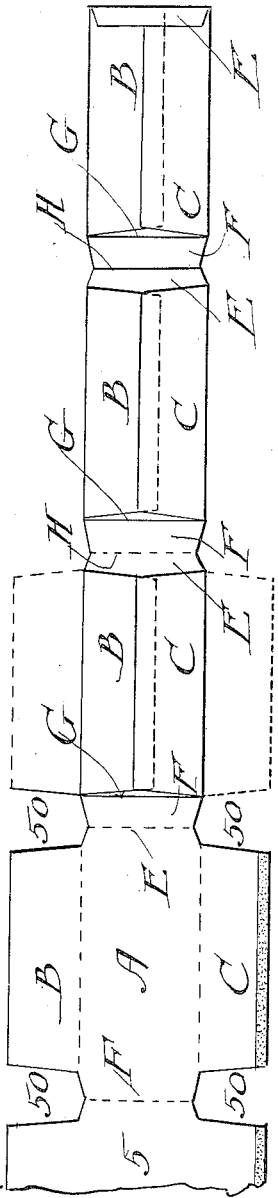
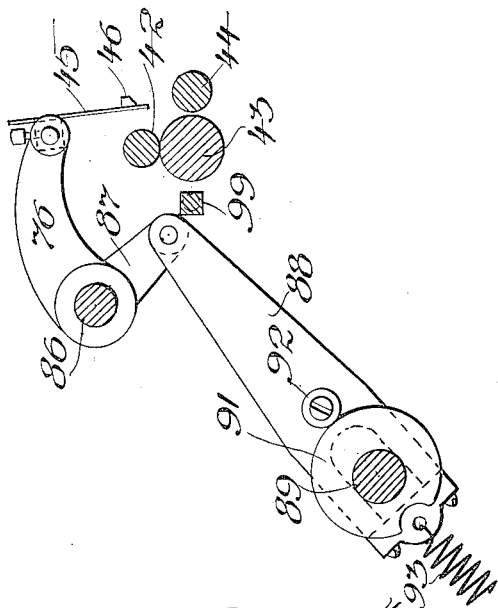

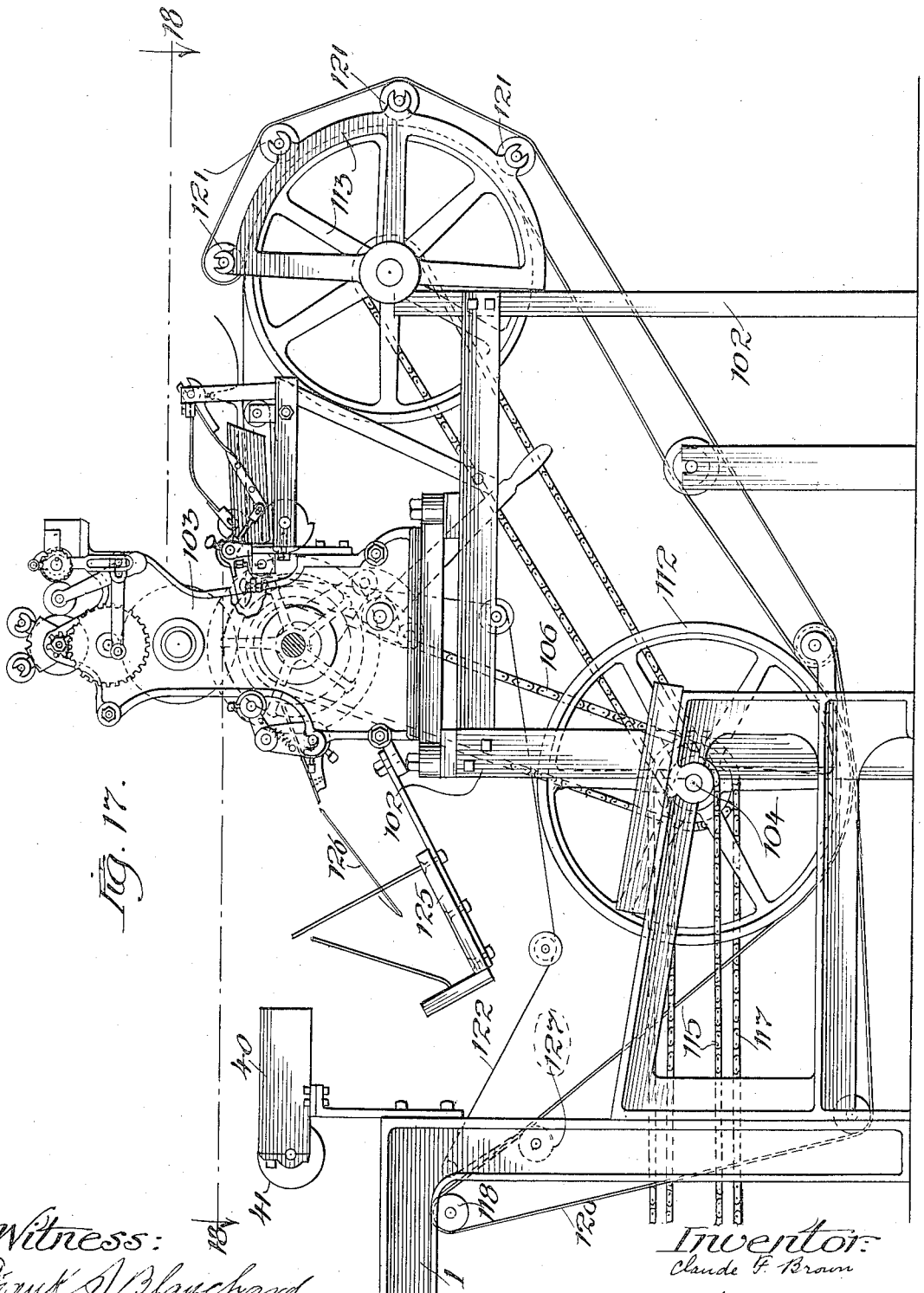

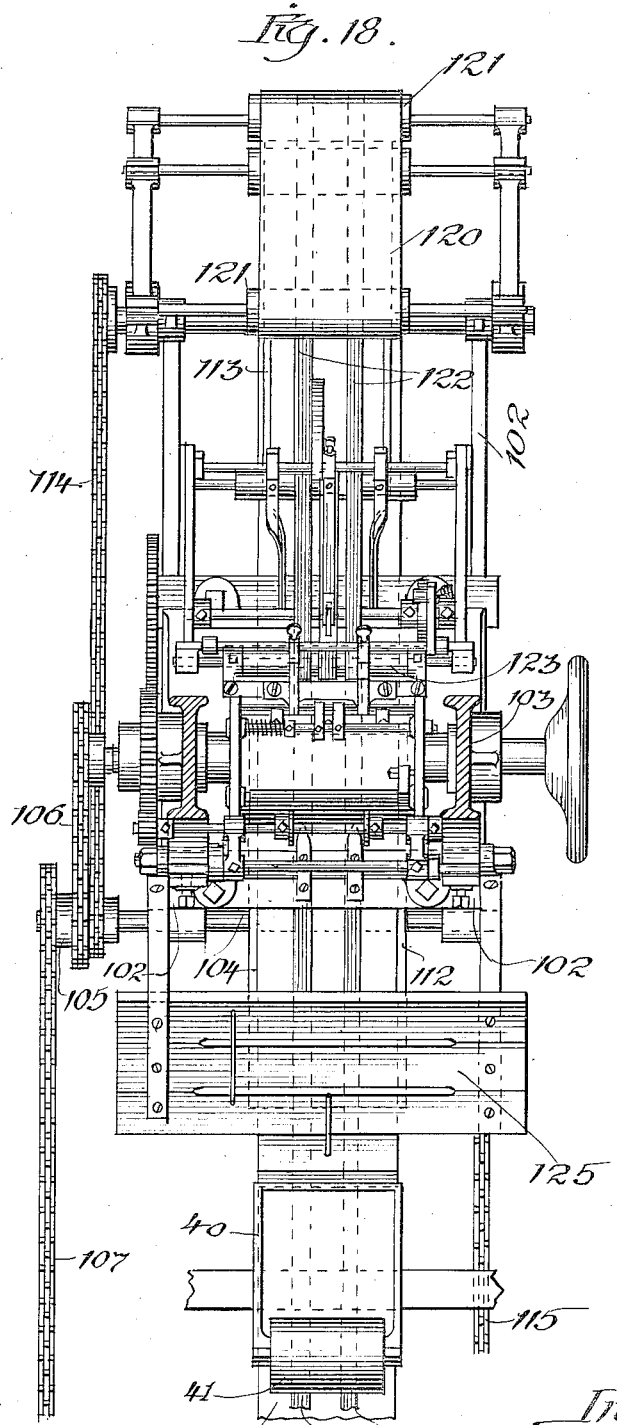

CLAUDE F. BROWN, OF CHICAGO, ILLINOIS, ASSIGNOR TO HECO ENVELOPE AND PAPER COMPANY, OF CHICAGO, ILLINOIS, A CORPORATION OF ILLINOIS.

ENVELOP-MACHINE.

1,268,674.

Specification of Letters Patent.

Patented June 4, 1918.

Application filed October 2, 1915. Serial No. 53,830.

*To all whom it may concern:*

Be it known that I, CLAUDE F. BROWN, a citizen of the United States, residing at Chicago, county of Cook, State of Illinois, have invented a certain new and useful Improvement in Envelop-Machines, and declare the following to be a full, clear, and exact description of the same, such as will enable others skilled in the art to which it pertains to make and use the same, reference being had to the accompanying drawings, which form a part of this specification.

My invention relates to machines for making envelops and has for its object to produce a machine which shall be simple in construction and of great capacity.

A further object of my invention is to produce a machine for making envelops and printing thereon any desired matter.

A further object of my invention is to produce a simple and novel machine for making envelops of various sizes and printing any desired material in any selected space or zone thereon prior to the discharge of the envelops from the machine.

A further object of my invention is to produce a simple and novel envelop machine in which the material of which the envelop is made moves continuously from the time it enters the machine until it has been fashioned into a complete envelop.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of that portion of the machine arranged in accordance with my invention which forms the envelops;

Fig. 2 is a side view of that portion of the machine shown in Fig. 1;

Fig. 3 is a longitudinal central section taken at right angles to the plane of Fig. 1;

Fig. 4 is a section taken approximately on line 4—4 of Fig. 2;

Fig. 5 is a section taken approximately on line 5—5 of Fig. 2;

Fig. 6 is a side elevation, on an enlarged scale, of the creasing elements, forming a transverse crease at the base of the top flap;

Fig. 7 is a section taken at right angles to the plane of Fig. 6;

Fig. 8 is a side view, on an enlarged scale, of the devices for severing the envelops from the strip;

Fig. 9 is a top plan view of the parts shown in Fig. 8;

Fig. 10 is an enlarged detail of the paste pot and its delivery roll by means of which paste is supplied for sealing one end of the envelop;

Fig. 11 is a top plan view on an enlarged scale of the sealing mechanism for the advance end of the envelops;

Fig. 12 is a section taken approximately on line 12—12 of Fig. 11;

Fig. 13 is a view similar to Fig. 12 with the parts occupying different positions than in Fig. 12 and the feed rollers shown only in dotted lines;

Fig. 14 is a front view of the paste delivering and folding blade shown in Figs. 12 and 13;

Fig. 15 is a section taken approximately on line 15—15 of Fig. 11;

Fig. 16 is a plan view of a strip from which the envelops are made, showing the different steps in the formation of the envelops;

Fig. 17 is a side elevation of the envelop printing mechanism and conveying means for delivering the envelops thereto;

Fig. 18 is a section taken approximately on line 18—18 of Fig. 17.

Referring to the drawings, 1 represents a suitable supporting frame. At one end of the frame is a pasting apparatus, 2, below which is a suitable support, 3, for holding a roll of paper, 4, so that it lies horizontal and rotates under a pulling action on the free end of the paper strip, 5. The pasting devices consist conveniently of a receptacle, 6, in which is arranged a revoluble disk or wheel, 7; together with a mutilated wheel 8, mounted outside of the paste receptacle on an axis parallel with the axis of the wheel 7 and adapted to engage with the periphery of the latter wheel. A portion of the periphery of the wheel 8 is cut away so as to leave an unmutilated circumferential length equal to the length of the side flaps of the envelop to be made. To make the machine adjustable for envelops of different lengths a series of wheels, 8, different from each other, are provided. On the side of the wheel 8 opposite that on which the wheel 7 is located is a horizontal roll, 9, over which the strip of paper passes. It will be seen, as the paper is drawn over the roll 9, assuming that the wheels 7 and 8 are revolving, that the wheel 8 will pick up paste from the wheel 9 and will deliver it in the form of a stripe along one edge of the paper.

On the frame of the machine just in advance of the roll 9 are the stationary beds, 10, carrying the mechanism for cutting opposed sections from the sides of the moving strip to fashion the strip into a series of completed connected blanks. These beds are conveniently mounted at their ends on stationary parallel bars or shafts, 11, permitting the beds to be adjusted from and toward each other. Each bed has a wide slot, 12, extending from the outer edge transversely to a point near the inner edge thereof; the inner end of the slot being bounded by hardened blocks or cutters, 13, forming the stationary members of the cutting mechanism and having a contour corresponding to that of the excisions to be made in the sides of the strip. Beside the outer ends of the slots 12 are upwardly projecting ears, 14, forming bearings for longitudinally-extending horizontal shafts, 15, on which are fixed cutting members, 16, complementary to the dies 13; the cutting members 16 being so shaped that as the supporting shafts are rotated, the members 16 will pass down through the stationary dies in close proximity to all of the edges of the latter and thus punch out sections of the passing strip. The parts are preferably so arranged that all of the working edges of the member 16 and the dies 13 come into play at the same time, the action being that of a punch rather than of a pair of shears.

Each of the cutting arms, 16, is provided with an opening, 17, extending through the same and, on the under side thereof, and extending across the opening, is a spring finger, 18, free at its outer end and fixed to the corresponding arm at its inner end; the free end of the finger normally lying at some distance away from the supporting arm so that the springs are placed under tension when the arms come in proximity to the paper and serve as strippers which prevent the cutout pieces of paper from sticking to the arms.

Below the cutting mechanisms are conduits, 19, open at their upper ends and connected to the suction side of a suitable blower, 20. As the waste material is cut out of the strip it is delivered into the conduits 19 and is carried away by the suction therein.

Just beyond the cutting mechanism is a mechanism for forming a transverse crease at the base of the flap which is left open in the completed envelop. This mechanism, best shown in Figs. 6 and 7, consists of two rotary shafts, 21 and 22, extending horizontally, one above the other, in position to receive the web between them. On the shaft 21 is a blade, 23, projecting radially therefrom in a plane parallel with the axis, the blade having a sharp outer edge. On the shaft 22 is a member, 24, similar to the blade 23 except that in its outer edge it has a longitudinal V-shaped groove, 25, adapted to receive the sharp edge of the blade 23. The parts are so arranged that once during each revolution of the shafts 21 and 22 the blade, 23, enters the groove 25, thereby forming a crease in the passing strip of paper.

After passing through the creasing mechanism the strip enters the folding devices which fold the side flaps of the envelops inwardly with the flap having the stripe of paste thereon overlying the other flap. The folding means may conveniently consist of a horizontal bed, 26, under which the strip passes after it travels through the creaser, and suitably shaped side guides, 27 and 28, having warped or cam surfaces by means of which the side flaps will be properly folded inwardly over the bed 26. In the arrangement shown, the bed is supported by a suitable bracket, 29, which lies above the same and is adjustably connected to a stationary part of the frame as indicated at 30, so as to permit the bed to be shifted vertically. The guide, 27, is adapted to fold the corresponding flap inwardly ahead of the flap on the other side and therefore I have provided the member 29 with a projecting wire finger, 31, which is adapted to underlie the flap acted on by the guide 28 and hold it raised until the other flap is completely folded down. I also provide the member 27 with a finger, 32, which is adapted to overlie the corresponding flap after it has been folded down and prevent it from rising. The members 27 and 28 are suitably supported on a transverse bar, 33, and fastened thereto in any suitable way as, for example, by a bolt and slot connection, 34, which will permit them to be adjusted from and toward each other so as to adapt them to act upon envelops of various sizes.

Beyond the end of the bed 26 are the main feed rolls, 36 and 37, which receive the strip with the side flaps folded inwardly and serve to draw the strip through the machine.

Beyond the main feed rolls is the sealing mechanism the details of which are best illustrated in Figs. 10 to 15. The sealing mechanism comprises a pot, 40, having in the end toward the advancing envelop material a rotatable roll, 41, which, rotating in contact with the paste in the pot, is always covered with a thin layer of paste. The oncoming envelop, which forms the advance end of the strip, passes between rolls, 42 and 43, arranged one above the other in proximity to the paste roll 41. Adjacent to the roll 43, on the side next to the paste roll, is a roll, 44, similar to the roll 42. Movable up and down in proximity to the paste roll, between the latter and the roll 42 is a folding and pasting blade, 45, which has near its lower edge a projecting rib, 46, adapted to strike against the paste roll during each cycle of movement, and obtain a coating of paste. As the blade descends at the proper instant, it engages with the oncoming envelop just at the base of the open flap at the advance end, causing the flap to fold back and the folded edge to enter between the rolls 43 and 44. As the envelop enters between the rolls 43 and 44 the inner surface of the flap is pressed back against the paste-covered rib, 46, and receives a layer of paste. The blade is withdrawn after having delivered its paste to the flap and the flap is then effectively sealed by being pressed against the body of the envelope while passing between the rolls 43 and 44. Between the sealing mechanism just described and the main feed rolls is a mechanism for severing the completed envelop from the strip. This mechanism consists of a stationary cutter, 48, and a rotary cutter, 49, having their edges lying in a plane at right angles to the direction of movement of the strip, the strip passing over and resting upon the stationary cutter 48 and the rotary cutter, like the members 16, rotating continuously and, at the proper instant, swinging past the stationary member and shearing the completed envelop which is passing between the rolls 43 and 44 from the strip. The details of this cutting mechanism are best shown in Figs. 8 and 9, it being seen that at the time the rotary member 49 is in its cutting position, its cutting edge is parallel with the coöperating edge of the stationary member 48, so that the cutting of the strip is simultaneous at all points across its width.

The mechanisms heretofore described are all suitably driven in any convenient way to make them operate in proper time relation to produce the intended results; the various operations being perhaps most clearly shown in Fig. 16. Referring to this figure 50, 50 represent the excisions made in the sides of the traveling strip, thereby forming the strip into a series of connected envelop blanks each comprising a central body member, A, side flaps, B and C, and end flaps, E and F. In passing through the creasing mechanism each blank is creased along the line G at the base of the trailing or rear flap, F. In passing through the initial folding mechanism, first the flap B and then the flap C of each envelop is folded inwardly. The next operation is the closing and sealing of the flap E and the final operation consists in severing the completed envelop from the strip along the line H. In order to make wider envelops, without varying the length, the tables or beds, 10, are adjusted as heretofore described and the mechanism for folding the side flaps inwardly is also adjusted. If desired, the folding and sealing blade for closing the advance end of the envelop may also be changed whenever the width of the envelop is changed so as to have it always of a length equal to the width of the envelop. When the length of the envelop to be made is varied, the speed of the feed rolls relative to the other mechanisms is varied so that the paper will be fed faster or slower and thus feed the strip a greater distance or a lesser distance during each rotation of the cutting and creasing devices. Furthermore, a readjustment of the cutting, creasing and sealing devices must be made in order to bring them in proper time relation to each other. This may conveniently be accomplished by running the machine slowly until the first pair of excisions, 50, reaches the creasing mechanism, the creasing devices being then shifted angularly so as to bring them into proper relation to the strip. The strip is then fed forward until the open end of the advance envelop is in position to be sealed and the sealing blade is then shifted to bring it in proper time relation. Finally, when the advance envelop is firmly gripped between the rolls 43 and 44, the transverse rotary cutter is adjusted so that it will sever each envelop at the proper instant. Whenever the length of the envelops is varied, the pasting wheel, 8, is also changed, and the peripheral speed at which it is driven is varied to conform with the speed at which the new strip is to travel.

While the various mechanisms heretofore described may be driven in various ways, I have illustrated one arrangement which will serve as an example for building a complete machine, although the details are not all essential.

All the mechanisms are illustrated as being driven from a main shaft, 51. A sprocket chain, 52, passing over a wheel on the shaft 51 and over a sprocket wheel on a countershaft, 53, at the front end of the machine rotates this latter shaft and through a sprocket chain, 54, and gearing, 55, rotates the paste wheels 7 and 8. By substituting other wheels for those in the train 55, the speed of the paste wheels relative to that of the main shaft may be varied. The rotary cutting members 16 are driven as follows: On the inner end of each of the shafts 15 on which these members are supported is a spiral gear, 56, meshing with a complementary gear, 57, fixed on a transverse shaft, 58. The shaft 58 is geared to a shaft, 59, by means of intermeshing gear wheels, 60. The shaft, 59, is driven from the main shaft by means of a sprocket chain, 61. The shafts 21 and 22 of the creasing mechanism are geared together by wheels, 62, which cause them to rotate in unison but in opposite directions, and the shaft, 22, is driven from the main shaft by means of a sprocket chain, 63. The feed rolls 36 and 37 are geared together and are driven from the main shaft by a train of gears, 65. This train of gears can readily be changed when it is desired to vary the length of the envelops which are being made. The rotary cutting member, 49, is carried upon a shaft, 66, which extends parallel with the direction of movement and at one side of the path of the strip. On one end of the shaft 66 is a bevel gear wheel, 67, meshing with a coöperating wheel, 68, on a stub shaft, 69, which is driven from the main shaft by means of a sprocket chain, 70.

The feed rolls 42, 43 and 44 are geared together and they are driven directly from the main feed roll, 37, by means of a belt, 71, passing over pulleys, 72 and 73, on the ends of the rolls 37 and 43, respectively. The drive between the rolls 37 and 43 is so arranged that the roll 43 always tends to feed the strip faster than it is being delivered by the main feed rolls. The result is that the paper is held taut while the rotary cutter is descending to sever it from the strip, and it is then carried forward out of the way rapidly so as not to interfere with the advancing envelop.

The means of mounting and operating the folding and sealing blade, 45, which is best illustrated in Figs. 11 to 15, contains some novel features of invention. The blade, 45, is carried upon a shaft, 75, which is mounted on the outer ends of a pair of arms, 76, projecting from a transverse rock shaft, 86. The shaft 75 is rotatable in its supports and, at one end, is provided with a downwardly-projecting arm, 77, rigidly attached thereto and having a roller, 78, at its lower end. In the same longitudinal plane as the roller is a stationary post, 79, having an inclined upper end, 80. A spring, 81, attached to the arm 77 constantly exerts a tension tending to draw it in the direction of the post 79. Projecting downwardly from the rock shaft 86 is a crank arm, 87, to which is attached one end of a connecting rod, 88. The opposite end of the connecting rod is made in the form of a fork which straddles a transverse shaft, 89, driven from the main shaft by means of a sprocket chain, 90. On the shaft, 89, is a cam, 91, and on the connecting rod 88 is a cam roll, 92. A spring, 93, acts on the arm 88 in opposition to the cam and in a direction tending to lower the pasting and sealing blade, 45. The parts are so proportioned that when the sealing blade is raised as high as it will go, the roller on the lower end rises above the top of the adjacent vertical edge of the post 79 and the spring 81 draws the roller up the inclined top of the post until the pasting rib, 46, engages with the paste roll, 41. When the rock shaft 86 starts to turn in the direction to lower the blade, the roller, 78, connected with the latter, travels down the inclined top of the post until it engages with the advance flap of the envelop as heretofore described, presses it down between the rolls 43 and 44 and supplies it with sufficient paste to make a tight seal.

It is necessary that the roll 41 be turned from time to time, preferably after each descent of the pasting blade, 45, in order that it may always present a freshly covered surface to the blade. This may conveniently be accomplished by attaching to one end of the paste roll a ratchet wheel, 93, as best shown in Fig. 10 and providing an operating pawl, 94, for turning the wheel step by step. The pawl may be moved in one direction by a spring, 95, and in the opposite direction by means of a cam, 96, on a shaft, 97, driven in any suitable manner as, for example, by means of a sprocket chain, 98, driven from the shaft 89.

There is another small feature that has not heretofore been described but which adds to the successful feeding of the material. Just in front of the roll 43 is a bar, 99, extending transversely across the machine. On this bar are adjustably arranged two spring fingers, 100, projecting in the direction of travel of the strip, the free ends of the fingers lying just in front of the line on which the rolls 43 and 42 engage with each other and the fingers rising gradually as they recede from the rolls. Two other fingers, 101, are secured to the bar and have their free ends extending longitudinally just below the plane of the strip. With this arrangement the strip after leaving the main feed rolls is guided by the fingers between the rolls 42 and 43.

The majority of envelops for commercial purposes are required to contain printed matter on their front faces, either in the form of an advertisement, an ornamentation, or a return card, and one of the features of the present invention consists in providing means for printing the completed envelops before they are discharged from the machine. To this end I have arranged beyond the end of the frame 1 at which the envelops are finished, an auxiliary frame, 102, on which is mounted a printing press, 103. Journaled in the frame 102 in front of and below the printing press is a horizontal shaft, 104. On this shaft is a double sprocket wheel, 105, from one member of which extends a sprocket chain, 106, for driving the printing press while from the other member extends a sprocket chain, 107, which passes around one member of a double sprocket wheel, 108, loose on a countershaft, 109, supported by the main frame 1. A sprocket chain, 110, between the main shaft, 51, of the machine and the remaining member of the double sprocket, 108, serves to complete a driving connection between the printing press and the main shaft so that the printing press will operate whenever the envelop-making machine is running. On the shaft 104 is a comparatively wide pulley or drum, 112, while behind the printing press is supported a similar pulley or drum, 113, having its highest point approximately in the horizontal plane along which the work enters the printing press. The pulleys or drums, 112 and 113, are connected together by a sprocket chain, 114, so that they will rotate in unison. The shaft, 104, and therefore the drum 112, is driven by means of a sprocket chain, 115, passing over a sprocket wheel fixed to the shaft 109. On one end of the shaft 109 is a driving pulley, 116, by which power may be supplied independently of the main shaft of the envelop-making machine.

On the main frame, 1, just below the rolls 43 and 44 are two horizontal rolls, 118 and 119, spaced a short distance apart. A wide endless belt, 120, of any suitable material passes around the roll, 118, underneath the drum 112 and over a series of idle rolls, 121, distributed around the drum or pulley, 113, in suitable stationary bearings; one portion of the belt engaging with the pulley or drum 113. It will thus be seen that pulleys or drums, 112 and 113, serve to drive the endless belt. A plurality of narrow endless tapes, 122, pass over the roller, 119, one-half going underneath the drum or pulley 112 and following the inner run of the belt 120 to the top of the pulley or drum, 113, where it passes forward over a roll, 123, in proximity to the printing press and continues down around a series of idle rollers to the upper side of the roller, 119. Since the rollers 118 and 119 are placed a short distance apart, the belts, 120 and 122, form a sort of pocket extending downwardly from the inner sides of the rollers; the sealed envelops as they leave the rollers 43 and 44 dropping down into this pocket and being carried by the belts into the printing press where they are suitably printed and are finally discharged upon a receiving table, 125; 126 in Fig. 17 representing an envelop in the act of leaving the printing press. In order to give a definite depth to the pocket between the conveying belts and insure that the envelops will be firmly grasped between the belts before they can become displaced, I place an idle roller, 127, at a short distance below the rollers 118 and 119 and in such a position that both the belts 120 and the belts 122 press against the same. Consequently, as soon as an envelop enters the pocket formed between the two belts or sets of belts, it is gripped by the belts and carried forward without possibility of shifting its position.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a machine of the character described, feeding and sealing rolls, means for forming an envelop and delivering it above said rolls with an open flap at the advance end, a paste-covered roll lying above and parallel with the aforesaid rolls, a blade having its lower edge parallel with the axes of said rolls, a longitudinal rib projecting from said blade on the side toward the paste roll and at some distance from said edge, and means for operating said blade so as to shift it from a position in which said rib engages with said paste roll to a position in which it engages with said flap at the line of junction between it and the envelop and presses it between said feeding and sealing rolls.

2. In a machine of the character described, mechanism for feeding a strip continuously, cutting mechanism including members constructed and arranged to remove sections at intervals from the sides of the strip without producing any feeding action on the strip, means acting on the sides of the strip to fold them inwardly, creasing mechanism adapted to act on said strip to form creases therein without acting to feed the strip, and driving connections for said mechanisms including easily removable gears which may be replaced by other gears to permit the feeding mechanism to operate at various speeds relatively to the speeds of the other of the aforesaid mechanisms according to the length of envelop desired.

In testimony whereof, I sign this specification.

CLAUDE F. BROWN.